United States Patent
Seidman

(10) Patent No.: US 6,452,930 B1
(45) Date of Patent: Sep. 17, 2002

(54) METHOD AND APPARATUS FOR COMBINING CONTENT FROM A BROADCAST COMMUNICATION WITH CONTENT FROM A POINT-TO-POINT COMMUNICATION IN A UNIFIED PRESENTATION

(75) Inventor: James L. Seidman, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/175,687

(22) Filed: Oct. 20, 1998

(51) Int. Cl.$^7$ .............................................. H04J 15/00
(52) U.S. Cl. ...................................................... 370/400
(58) Field of Search .............................. 370/400, 265, 370/310; 380/54

(56) References Cited

U.S. PATENT DOCUMENTS 4,694,490 A * 9/1987 Harvey et al. ................ 380/54

* cited by examiner

Primary Examiner—Salvatore Cangialosi
(74) Attorney, Agent, or Firm—Terri S. Hughes; Romi N. Bose; Hisashi D. Watanabe

(57) ABSTRACT

A content provider (100) generates broadcast and point-to-point communications and transmits the communications to a subscriber device via a transport medium (105). A broadcast communication is transmitted to all subscriber devices (110, 115, 120, 125) of the transport medium (105) simultaneously. A point-to-point communication is transmitted specifically between the content provider (100) and the subscriber device (110), where only the content provider (100) and the subscriber device (110) have access to the point-to-point communication. Both broadcast and point-to-point communications are received at the subscriber device. The content of the broadcast communication is combined with content of the point-to-point communication to create a combined communication. The combined communication is presented to a subscriber in a unified presentation.

17 Claims, 3 Drawing Sheets

| BYTES (HEXIDECIMAL) | DESCRIPTION |
|---|---|
| 0BD4 | MESSAGE IDENTIFIER |
| 30 | MESSAGE LENGTH |
| 56 6F 70 20... | MESSAGE CONTENT (48 BYTES) "TOP HEADLINE:..." |
| 15 D8 | MESSAGE IDENTIFIER |
| 2E | MESSAGE LENGTH |
| 56 68 69 73... | MESSAGE CONTENT (45 BYTES) "THIS CONTENT..." |
| 33 62 | MESSAGE IDENTIFIER |
| 31 | MESSGE LENGTH |
| 57 65 20 6E... | MESSAGE CONTENT (49 BYTES) "WE NOW PROVIDE..." |

METHOD AND APPARATUS FOR COMBINING CONTENT FROM A BROADCAST COMMUNICATION WITH CONTENT FROM A POINT-TO-POINT COMMUNICATION IN A UNIFIED PRESENTATION

FIELD OF THE INVENTION

The present invention relates to a method and apparatus for combining content from a broadcast communication with content from a point-to-point communication in a unified presentation.

BACKGROUND OF THE INVENTION

Communication between a server and a client on a network take one of two forms of communications: broadcast or point-to-point. In a broadcast communication, the server sends information that is transmitted to every client on the network, although some clients might ignore the information. The same information is sent to every client with no customization possible. The advantage to using a broadcast communication is to save bandwidth. Bandwidth is saved because the information is sent over each link of the network only once regardless of the number of recipients of the information.

In a point-to-point communication, the server transmits information separately to each client. An advantage to using a point-to-point communication is that different information (e.g., customization) may be sent to each client. Even if the same information is being sent to several recipients (e.g., radio broadcast over the Internet), however, in a point-to-point communication with multiple recipients, the information is transmitted redundantly to each recipient. Therefore, if a large number of recipients are receiving the same information, the bandwidth utilization is greater to transmit the information via a point-to-point communication as opposed to transmitting the information via a broadcast communication.

In light of the foregoing, there exists a need for an improved method and apparatus that overcomes the disadvantages of both broadcast and point-to-point communications in a unified presentation, thus utilizing minimum bandwidth and providing customization, if desired, to each recipient.

BRIEF DESCRIPTION OF THE DRAWINGS

A preferred embodiment of the present invention is now described, by way of example only, with reference to the accompanying drawings in which.

DETAILED DESCRIPTION OF THE PREFERRED EMBODIMENT

The present invention provides a method and apparatus that combines content from a broadcast communication with content from a point-to-point communication in a unified presentation for content distribution. Combing content from a broadcast communication with content from a point-to-point communication allows the present invention to take advantage of minimizing bandwidth, as with a broadcast communication, and providing customization to each recipient, as with a point-to-point communication.

The present invention combines content from a broadcast communication with content from a point-to-point communication by allowing a point-to-point communication to reference a broadcast communication using positional information. Such a configuration allows less-dynamic common information (e.g., advertising which remains the same for an entire day) to only be broadcast once, stored on the subscriber device or application and possibly referenced multiple times by different point-to-point communications.

A broadcast communication, as referred to in accordance with the present invention, is defined as transmitting information to all subscribers of a network (i.e., a transport medium) simultaneously. A point-to-point communication is defined as transmitting information specifically between two points on a network (e.g., a content provider and a subscriber device or application) and only those two points have access to the information transmitted. Moreover, as referred to in accordance with the present invention, "content" of a communication, either broadcast or point-to-point, is understood by one skilled in the art as being a portion or payload of a communication that is intended for ultimate presentation to a user, either visually or audibly or as an audiovisual presentation, after any header and signaling has been remove or processed by protocol layers that operate to deliver the ultimately presented portion or payload.

Figure 1:
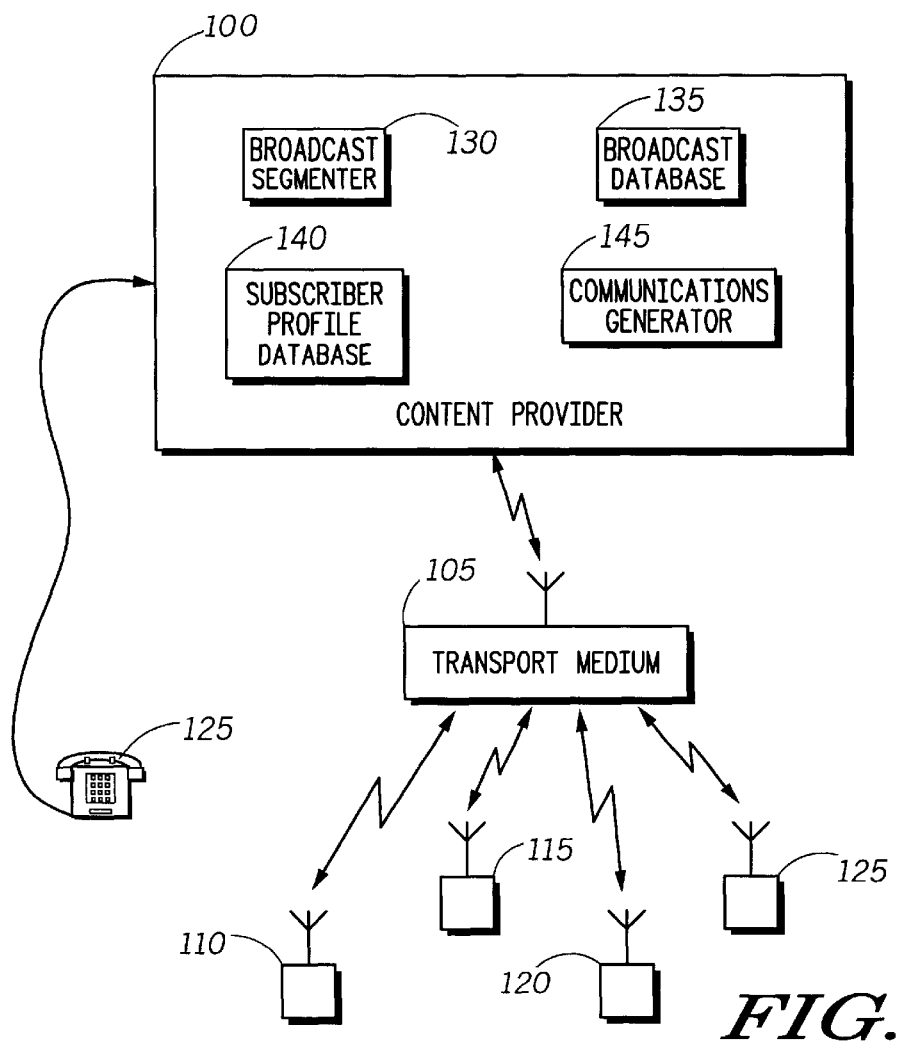
FIG. 1 is a block diagram of a system according to the preferred embodiment of the present invention.

For ease of understanding, a block diagram of the overall system is illustrated in FIG. 1. As shown in FIG. 1, the system comprises a content provider 100 (e.g., American Broadcast Company, Columbia Broadcasting Service, National Broadcasting Company, ESPN, Disney, an on-line gaming company, etc.), a transport medium 105 (e.g., a paging carrier (e.g., SkyTel), a digital cellular network (e.g., code division multiple access, global system for mobile communication, time division multiple access), etc.) and a plurality of subscriber devices or applications 110, 115, 120, 125 (e.g., a pager, cellular telephone, etc.).

The content provider 100 transmits broadcast and point-to-point communications to the plurality of subscriber devices or applications 110-125 via the transport medium 105.

Figure 2:
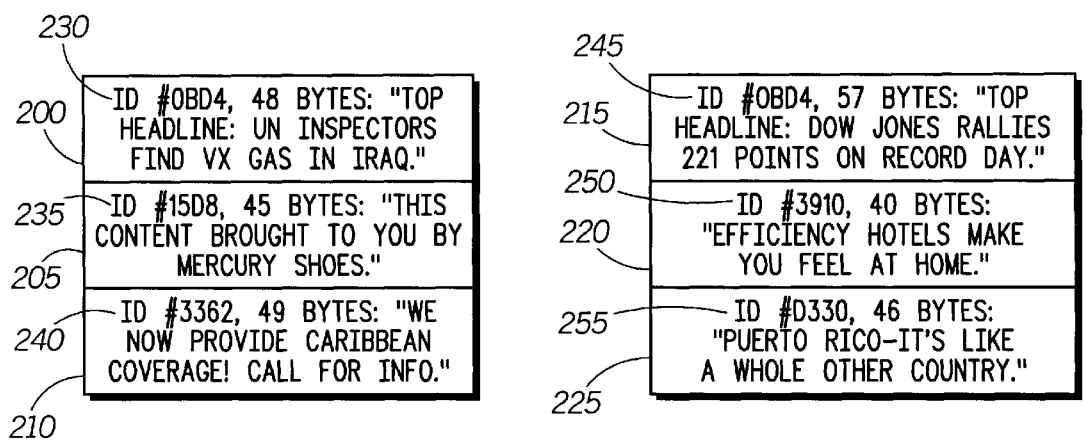
FIG. 2 is a typical transmission sequence of a first and a second broadcast communication segmented into broadcast segments according to the preferred embodiment of the present invention.

The content provider 100 comprises a broadcast segmenter 130, a broadcast database 135, a subscriber profile database 140 and a communications generator 145. Prior to the content provider 100 transmitting a broadcast communication to the plurality of subscriber devices or applications 110-125, the broadcast segmenter 130 segments the broadcast communication into broadcast segments as shown in FIG. 2. It should be noted, however, that a broadcast communication can have any number of broadcast segments. The two (2) broadcast communications shown in FIG. 2 each contain three (3) separate broadcast segments 200, 205, 210, 215, 220, 225 of advertising or headline/news of general interest. . For example purposes only, lets assume that the first broadcast communication, having broadcast segments 200, 205, 210, is broadcast at 3:35 AM on Oct. 15, 1998 and the second broadcast communication, having broadcast segments 215, 220, 225, is broadcast at 11:20 AM on Oct. 15, 1998.

Each broadcast segment 200–225 is identified with a two (2) byte identifier and a length indication (hereinafter referred to collectively as a "message identifier" 230, 235, 240, 245, 250, 255). The message identifiers 230–255 are formatted in such a way to allow a point-to-point communication to incorporate content from a broadcast communication (e.g., advertisements and/or headline) with content from the point-to-point communication merely by referencing a message identifier 230–255 of an appropriate broadcast segment 200–225 (described in detail below).

The content from a broadcast communication is combined with content from a point-to-point communication in a unified presentation by interspersing content from the broadcast communication between content from the point-to-point communication; interspersing content from the point-to-point communication between content from the broadcast communication;

integrating content from the broadcast communication above content from the point-to-point communication; or integrating content from the broadcast communication below content from the point-to-point communication.

Figures 3, 4:
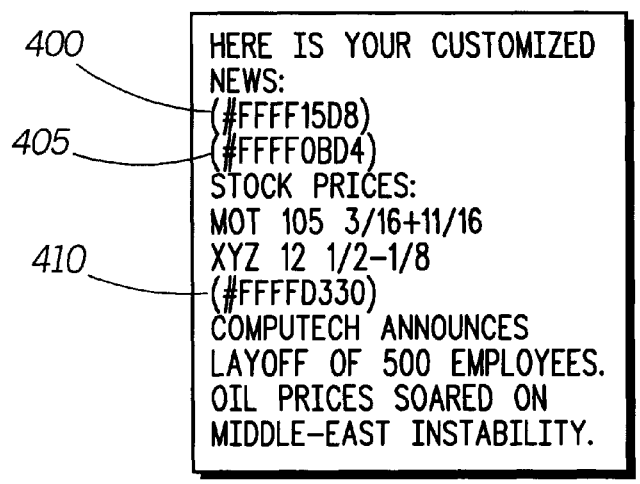
FIG. 3 is a byte encoding for the first broadcast communication of FIG. 2 according to the preferred embodiment of the present invention.
FIG. 4 is a point-to-point communication referencing broadcast segments from FIG. 2 according to the preferred embodiment of the present invention.

FIG. 3 illustrates a byte encoding for the first broadcast communication according to the preferred embodiment of the present invention. As shown in FIG. 3, the message identifier, the message length and the message content, are encoded into bytes (hexadecimals) before transmission. For example, broadcast segment 200 is byte encoded as the following: "OBD4" for the message identifier, "30" for the message length, and 56 6F 70 20 . . . for the message content. The message identifier, the message length and the message content are encoded for each broadcast segment 205, 210 in the broadcast communication.

The broadcast database 135 keeps track of all the broadcast segments 200–225 transmitted to all of the subscriber devices or applications 110, 115, 120 and 125 of a transport medium 105. Every time the content provider 100 transmits a broadcast communication, which is divided into n-broadcast segments (where n is the number of broadcast segments in a particular broadcast communication), the nbroadcast segments are stored in the broadcast database 135. The content provider 100 decides which broadcast segments are inserted into each point-to-point communication. For example, a top news headline might be included in every point-to-point communication. More or less advertising could be included in a point-to-point communication, depending on the length of the point-to-point communication, in order to give the combined communication a roughly constant length. Further, certain advertising messages could be chosen to match characteristics of certain subscribers'profiles.

The subscriber profile database 140 keeps track of all of the subscriber's preferences. A subscriber 110 communicates to the content provider 100 the type of information he wishes to receive via a telephone 150 or via a point-to-point communication. Once the content provider 100 receives the subscriber's set of preferences, the content provider 100 stores them in the subscriber profile database 140 for later retrieval and use to create a customized point-to-point communication with the information requested by the subscriber from his set of preferences.

In a point-to-point communication, as shown in FIG. 4, the content provider 100 references broadcast segments 400, 405, 410 by simply using a special byte sequence, e.g., hexadecimal numbers, such as #FFFF, followed by the message identifiers 235, 245, 255 assigned to the desired broadcast segment 205, 215, 225, respectively, that is to be inserted. The point-to-point communication does not have to reference the specific location of the referenced broadcast segment within the broadcast communication or know the length of the content in the referenced broadcast segment. The point-to-point communication does not even need to specify which broadcast communication transmitted the referenced broadcast segment, as the message identifier assigned to a broadcast segment is unique.

It may be noted that if the content provider 100 duplicates a message identifier, such a duplication indicates that the content from the latter broadcast segment replaces the content from the former broadcast segment. Such a configuration provides the advantage that a broadcast segment can be updated using the same message identifier without requiring the content provider 100 to change/modify the referenced broadcast segment in the point-to-point communication. For broadcast segments that are updated frequently, such as a news provider's top news headline, a content provider 100 typically always uses the same message identifier.

Figure 5:
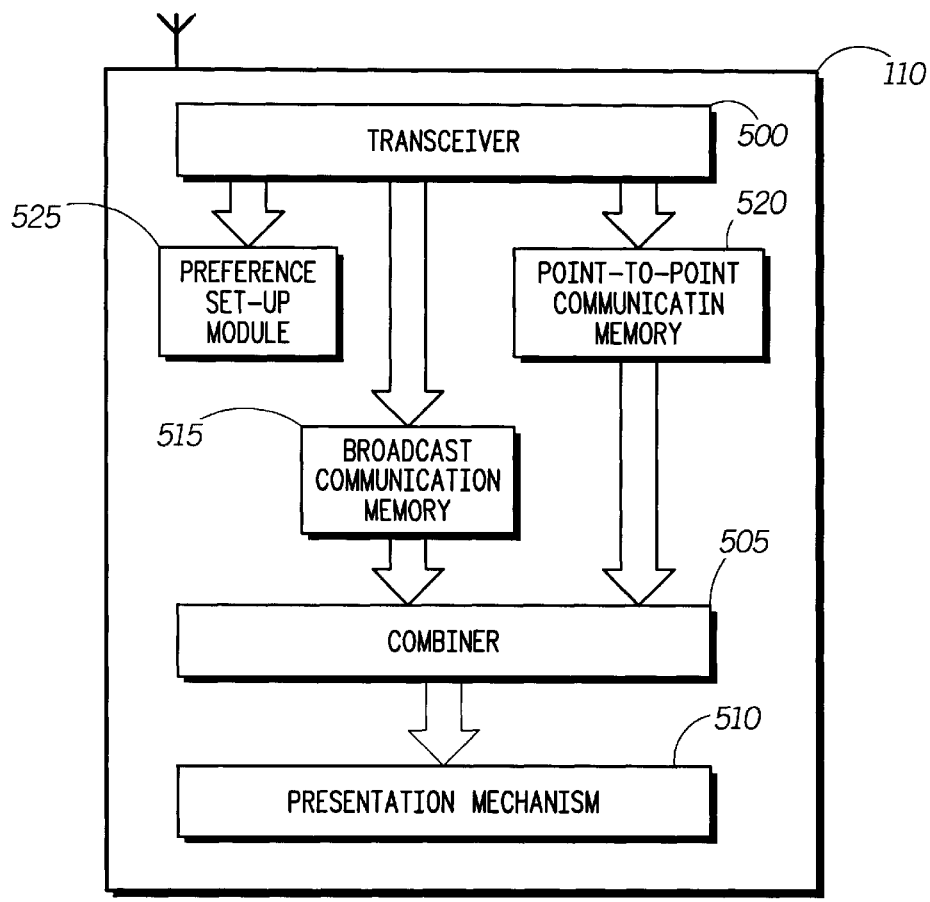
FIG. 5 is a block diagram of a subscriber device or application according to the preferred embodiment of the present invention.

As shown in FIG. 5, the subscriber device or application 110 comprises a transceiver 500, a combiner 505 and a presentation mechanism 510. The transceiver 500 is coupled to the transport medium 105 for receiving the broadcast and point-to-point communications. The combiner 505 is coupled to the transceiver 500 for combining the content from a broadcast communication(s) with the content from a point-to-point communication to create a combined communication. The presentation mechanism 510 is coupled to the combiner 505 for combining the combined communication to the subscriber device 110 in a unified presentation. The presentation mechanism 510 is either one of, but not limited to, a display, a graphical user interface, a loud speaker, or any other suitable mechanism for communicating the combined communication to the subscriber device 110.

The subscriber device or application 110 can optionally comprise a broadcast communication memory 515 and/or a point-to-point communication memory 520. Both the broadcast communication memory 515 and the point-to-point communication memory 520 are coupled between the transceiver 500 and the combiner 505. The broadcast communication memory 515 stores the broadcast segments 200–225 as they are received at the subscriber device or application 110 for possibly later use. The point-to-point communication memory 520 operates in the same manner as the broadcast communication memory 515, but with point-to-point communications.

The subscriber device or application 110 can further comprise a preference set up module 525 on the subscriber device or application 110 itself. The preference set up module 525 allows the subscriber to create or modify a set of preferences that the content provider 100 uses to create his point-to-point communications at the subscriber device or application 110 itself, as opposed to using the telephone 150 to communicate the set of preferences to the content provider 100.

In operation, the content provider 100 transmits broadcast communications, having broadcast segments 200–225, to the subscriber device 110 and all other subscriber devices 115–125 of the transport medium 105 via the transport medium 105. The subscriber device 110 and the other subscriber devices 115–125 receive the broadcast communications and store them in their broadcast communication memories 515. For purposes of this example, the subscriber device 110 and the other subscriber devices 110–125 are pagers and the transport medium 105 is a paging network, such as SkyTel. The content provider 100 now wants to send a personal (point-to-point) communication to a subscriber device 110. The content provider looks up the set of preferences, indicating the type of information the subscriber device 110 wants to receive, from the subscriber profile database 140. The content provider 100 also determines which broadcast segments he wants to combine with the point-to-point communication.

After the content provider 100 extracts the appropriate set of preferences from the subscriber profile database 140 and extracts the appropriate message identifiers from the broadcast database 135, the content provider 100 generates the point-to-point communication at the communications generator 145. The point-to-point communication is byte encoded and transmitted to the subscriber device 110 via the transport medium 105.

The point-to-point communication generated at the communications generator 145 is shown in FIG. 4. As indicated from the point-to-point communication in FIG. 4, the set of preferences for subscriber device 110 indicates that the subscriber want to receive current stock prices for Motorola, Inc. and XYZ Co. and also wants to receive the top headlines from the business section of a newspaper, such as that from the Chicago Sun-Times. FIG. 4 further illustrates that the content provider 100 wants to combine three (3) broadcast segments with the point-to-point communication by referencing three (3) broadcast segments 400, 405, 410 prefaced by the special byte sequence (e.g., #FFFF).

Upon receiving the point-to-point communication, the subscriber device 110 identifies the referenced broadcast segments by locating the special byte sequence. Upon locating the special byte sequence, the combiner 505 identifies the message identifiers 235, 245, 255, retrieves the appropriate broadcast segments 205, 215, 225 associated with the message identifiers from the broadcast communication memory 515 and combines the content of the broadcast segments 205, 215, 225 with the content of the point-to-point communication to create a combined communication. The combined communication is transmitted to the presentation mechanism 510 for final delivery to the subscriber as shown in FIG. 6.

Figure 6:
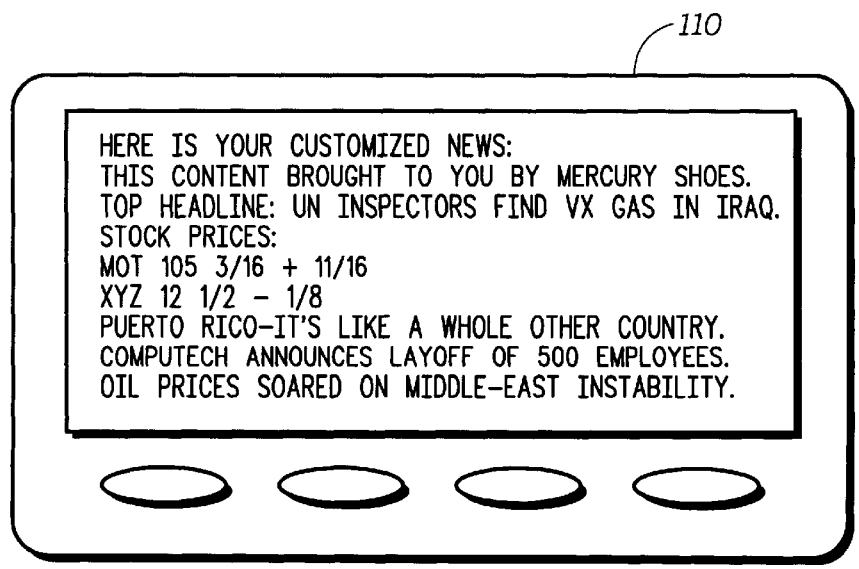
FIG. 6 is a customized point-to-point communication that is presented to a user by a presentation mechanism according to the preferred embodiment of the present invention.

The combined communication, as seen by the user in FIG. 6, is a customized message, which includes broadcast advertising and headlines, over three hundred (300) character bytes in length, even though the point-to-point communication of FIG. 4 was under one hundred and forty (140) character bytes in length. It is important to notice the duplicate message identifiers 230, 245 between the two (2) broadcast segments 200, 215 (e.g., #0BD4) of FIG. 2. Such a duplication in message identifiers makes the combined communication of FIG. 5 read " . . . Top headline: Dow Jones rallies 221 points on record day . . . " as opposed to " . . . Top headline: UN Inspectors find VX gas in Iraq . . . ".

Although the present invention is preferably utilized in a paging or digital cellular network, those skilled in the art will recognize a number of other applications for the present invention within the scope and spirit of the present invention. For example, the present invention is applicable in applications on desktop computers and the Internet.

A desktop computer, or any other suitable device, could operate an application which receives stock ticker information via a broadcast communication from the content provider 100 while simultaneously receiving customized financial information from the content provider 100 via a point-to-point communication, wherein the stock ticker and the customized financial information are presented to the subscriber in a unified presentation. Other applications could extend to other topics, such as sports, where up-to-the-minute scores are transmitted via a broadcast communication while simultaneously receiving customized statistics on a particular player (e.g., Sammy Sosa) via a point-to-point communication in a unified presentation.

A further application of the present invention is games played over the Internet (also known as the "World Wide Web"). The present invention allows the information, such as, where all of the players are located, what is going on in the "game world", etc., to be sent to each player via a broadcast communication in order to minimize the amount of bandwidth used. Simultaneously, the present invention allows information, such as, what a particular player can see at any given time, what a particular player is carrying in scavenger hunt-types of games, etc., to display specific details pertinent only to a particular player Still a further application of the present invention is in an "Internet chat room". The present invention allows a message that is intended to be sent to everyone in the "chat room" to be sent via a broadcast communication to everyone connected to the "chat room", thus using minimum bandwidth. Simultaneously, if a person in the "chat room" desires to send a personal message to a particular person, as opposed to the entire group, the personal message is sent via a point-to-point communication.

Thus, the present invention, in its broader aspects, is therefore not limited to the specific details, representative apparatus and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the invention.

I claim:

1. In an environment where a content provider venerates broadcast and point-to-point communications and transmits the communications to a subscriber device via a transport medium, wherein a broadcast communication is transmitted to all subscriber devices of the transport medium simultaneously and a point-to-point communication is transmitted specifically between the content provider and a subscriber device and only the content provider and the subscriber device have access to the point-to-point communication, a method for combining content from a broadcast communication with content from a point-to-point communication in a unified presentation comprising, at the subscriber device:

receiving both broadcast and point-to-point communications;

inserting content of the broadcast communication between content of the point-to-point communication to create a combined communication; and presenting the combined communication to a subscriber in a unified presentation.

2. The method according to claim 1 wherein the step of inserting comprises interspersing content from the broadcast communication between content from the point-to-point communication.

3. The method according to claim 1 wherein the step of inserting comprises interspersing content from the point-to-point communication between content from the broadcast communication.

4. The method according to claim 1 wherein the step of inserting comprises integrating content from the broadcast communication above content from the point-to-point communication.

5. The method according to claim 1 wherein the step of inserting comprises integrating content from the broadcast communication below content from the point-to-point communication.

6. The method according to claim 1 wherein the step of inserting comprises receiving both broadcast and point-to-point communications comprises:

segmenting the broadcast communication into broadcast segments;

assigning a message identifier to each broadcast segment; and storing each broadcast segment into a memory.

7. The method according to claim 6 wherein the point-to-point communication references a broadcast segment from the broadcast communication by its corresponding message identifier, and the step of inserting comprises retrieving the broadcast segment referenced in the point-to-point communication from the memory and inserting its contents into the point-to-point communication to create the combined communication.

8. The method according to claim 6 further comprising:

receiving a subsequent broadcast communication;

segmenting the subsequent broadcast communication into broadcast segments, wherein a broadcast segment (updated broadcast segment) of the subsequent broadcast communication is an updated version of a broadcast segment (previous broadcast segment) transmitted in a previous broadcast communication;

assigning a message identifier to each broadcast segment of the subsequent broadcast communication, wherein the updated broadcast segment is assigned the same message identifier as the previous broadcast segment; and storing each broadcast segment into a memory, wherein the updated broadcast segment replaces the previous broadcast segment in the memory.

9. An apparatus for combining content from a broadcast communication with content from a point-to-point communication in a unified presentation comprising:

a receiver for receiving broadcast and point-to-point communications;

a combiner, coupled to the receiver, for inserting content from the broadcast communication between content of the point-to-point communication to create a combined communication; and a presentation mechanism, coupled to the combiner, for presenting the combined communication to a subscriber in a unified presentation.

10. The apparatus according to claim 9 further comprising a broadcast memory coupled between the combiner and the transport medium.

11. The apparatus according to claim 9 further comprising a point-to-point memory coupled between the combiner and the transport medium.

12. The apparatus according to claim 9 further comprising a broadcast memory and a personal memory, both coupled between the combiner and the transport medium.

13. A storage medium having stored thereon a set of instructions which, when loaded into a microprocessor, causes the microprocessor to perform the following functions:

receive both broadcast and point-to-point communications, wherein a broadcast communication is broadcast to all subscriber devices of a network simultaneously and a point-to-point communication is transmitted to a subscriber device of a network and customized to a set of preferences;

insert content of the broadcast communication between content of the point-to-point communication to create a combined communication; and present the combined communication to a user in a unified presentation.

14. The storage medium according to claim 13 wherein the function to insert comprises interspersing content from the broadcast communication between content from the point-to-point communication.

15. The storage medium according to claim 13 wherein the function to insert comprises interspersing content from the point-to-point communication between content from the broadcast communication.

16. The storage medium according to claim 13 wherein the function to insert comprises integrating content from the broadcast communication above content from the point-to-point communication.

17. The storage medium according to claim 13 wherein the function to insert comprises integrating content from the broadcast communication below content from the point-to-point communication.

* * * * *

UNITED STATES PATENT AND TRADEMARK OFFICE
CERTIFICATE OF CORRECTION

PATENT NO. : 6,452,930 B1
DATED : September 17, 2002
INVENTOR(S) : Ariel et al.

It is certified that error appears in the above-identified patent and that said Letters Patent is hereby corrected as shown below:

<u>Column 6,</u>
Line 45, change "venerates" to -- generates --

Signed and Sealed this

Twenty-eighth Day of January, 2003

JAMES E. ROGAN
*Director of the United States Patent and Trademark Office*